United States Patent [19]

Reilly

[11] Patent Number: 4,960,343
[45] Date of Patent: Oct. 2, 1990

[54] CONNECTOR FOR CONNECTING HOLLOW RECTANGULAR TUBULAR MEMBERS

[75] Inventor: Frederick W. Reilly, Toronto, Canada

[73] Assignee: Miranda Investments Limited, Islington, Canada

[21] Appl. No.: 317,907

[22] Filed: Mar. 2, 1989

[30] Foreign Application Priority Data

Feb. 17, 1989 [CA] Canada ................................ 591358

[51] Int. Cl.[5] ............................................. F16B 7/00
[52] U.S. Cl. .................................... 403/171; 403/176; 403/217; 403/295
[58] Field of Search ............... 403/170, 295, 171, 172, 403/174, 176, 178, 217

[56] References Cited

U.S. PATENT DOCUMENTS

| | | |
|---|---|---|
| 2,926,941 | 3/1960 | Thompson . |
| 3,232,160 | 2/1966 | Fork et al. . |
| 3,532,369 | 10/1970 | Reilly . |
| 3,645,569 | 2/1972 | Reilly . |
| 3,666,298 | 5/1972 | Reilly . |
| 3,873,220 | 3/1975 | Kashiwabara .................. 403/217 X |
| 4,076,432 | 2/1978 | Glaser ............................ 403/171 X |
| 4,273,462 | 6/1981 | Fukuchi .............................. 403/171 |
| 4,484,429 | 11/1984 | Stephenson ..................... 403/171 X |
| 4,516,376 | 5/1985 | King ................................. 403/171 X |

FOREIGN PATENT DOCUMENTS

| | | |
|---|---|---|
| 841261 | 5/1970 | Canada . |
| 1266283 | 3/1972 | United Kingdom ................ 403/295 |

*Primary Examiner*—Peter M. Cuomo
*Attorney, Agent, or Firm*—Riches, McKenzie & Herbert

[57] ABSTRACT

A connector for connecting hollow rectangular tubular members. The connector comprises a cube-shaped base member with a plurality of diagonally extending spigots which are adapted to make a press fit within a respective tubular member by engaging appropriate interior surfaces of the tubular member. The connector allows for the use of commercial tubing and is less expensive than the prior art devices.

10 Claims, 2 Drawing Sheets

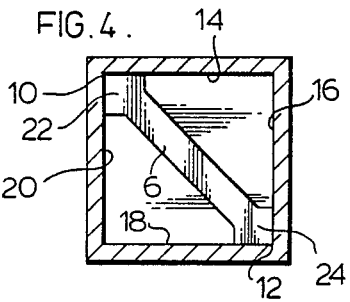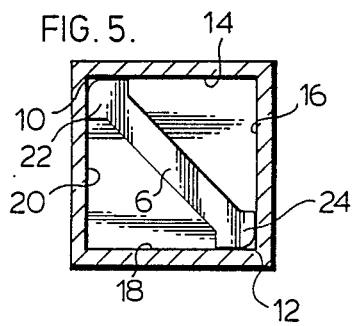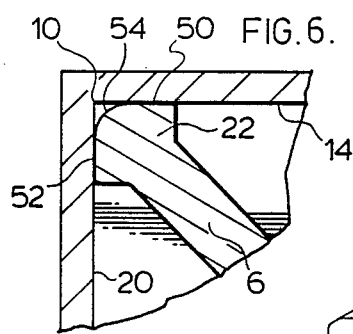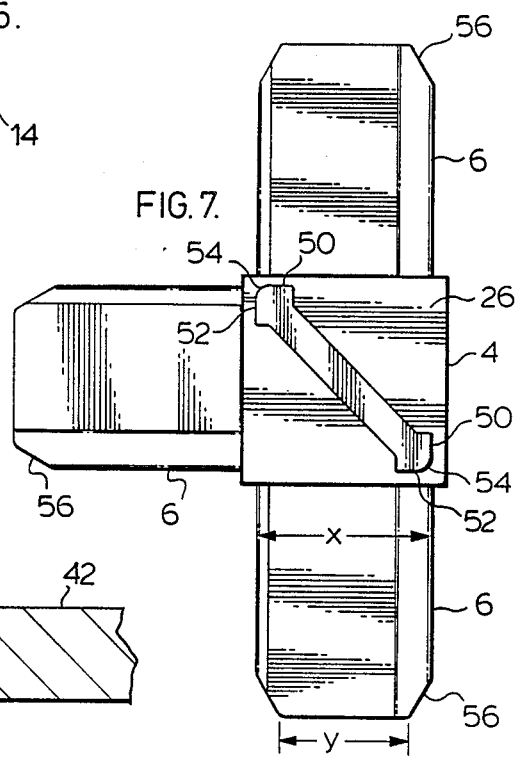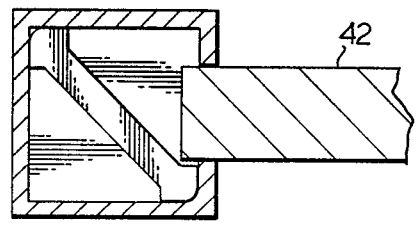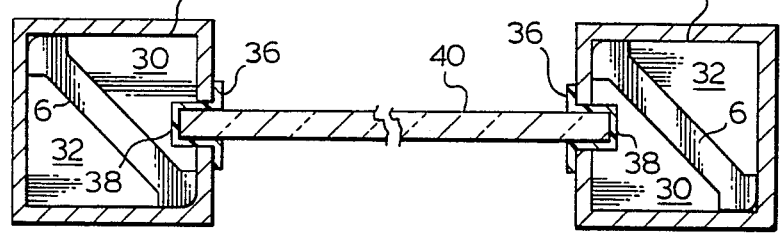

CONNECTOR FOR CONNECTING HOLLOW RECTANGULAR TUBULAR MEMBERS

BACKGROUND OF THE INVENTION

1. Field Of The Invention

This invention relates generally to connectors and more particularly to a novel connector for connecting hollow rectangular tubular members.

2. Description Of The Prior Art

Many different ideas and proposals have been made for connectors for connecting hollow rectangular tubular members. Such connectors are widely used to construct showcases, display cases, shelving, kiosks and the like and have a very wide use.

An early type of connector is shown in my U.S. Pat. No. 3,532,369 which used a block with posts extending therefrom and the rectangular tubular members were releasably secured to the posts. The posts had oppositely extending projections which were resiliently compressible. The essential feature of this invention was that the combined diameters of the post and the projections were less than the length of the diagonals of the tubular members and slightly greater than the perpendicular distance between opposite faces of the tubular member so that the post can be inserted into the tubular member and after axial rotation of the tubular member, the post effected a releasable interference fit between the projections and the inside of the tubular member.

That original connector was improved as shown in my U.S. Pat. No. 3,645,599 granted on Feb. 29, 1972 by using a vinyl insert between the tubular member and the spigot. A still further improvement is illustrated in my U.S. Pat. No. 3,666,298 which used a resiliently compressible plastic casing having longitudinal ribs corresponding in number to the number of sides of the tubular member. The casing is secured to the core so that there is no movement between the casing and the core.

Other devices may be seen in the prior art as illustrated in Canadian patent number 841,261 (dated May 12, 1970 to Peacock) U.S. Pat. No. 2,926,941 (Thompson) U.S. Pat. No. 3,232,160 (Fork et al) and others.

These prior art devices, while quite an improvement over the then existing prior art, have now become much more expensive particularly due to the increased cost of the vinyl or plastic inserts. Also, the costs have risen due to increased labour costs since the vinyl inserts must be manually inserted on the spigots and inspected to insure proper orientation and fit.

SUMMARY OF THE INVENTION

Accordingly, it is an object of the present invention to at least partially overcome these disadvantages by providing an improved connector for connecting tubular members which is less costly to manufacture and which is adapted for use with commercial tubing.

To this end, in one of its aspects, the invention provides a connector for connecting hollow tubular members comprising a cube-shaped base member having a plurality of diagonally extending spigots, each spigot projecting outwardly from a different face of said cube-shaped base member to a free end and each spigot extending from immediately inwardly of a corner of said base member diagonally straight across the respective face from which it extends to immediately inwardly of the opposite corner of said face, the diagonal taken across each spigot at the free end being marginally less than the diagonal across each respective opening in each tubular member and the diagonal taken across each spigot increasing immediately inwardly of the free end to a diagonal marginally greater than the diagonal taken across each respective opening in each tubular member such that when a spigot is inserted completely into the tubular member such that the tubular member is contiguous with the face of the base member, the spigot engages the inner wall of the tubular member to make a press fit therein.

In another of its aspects, the invention provides a connector for connecting hollow tubular members comprising a cube-shaped base member having a plurality of diagonally extending spigots, each spigot made of a zinc or aluminium casting and projecting outwardly from a different face of said cube-shaped base member to a free end and each spigot extending from immediately inwardly of a corner of said base member diagonally straight across the respective face from which it extends to immediately inwardly of the opposite corner of said face, the diagonal taken across each spigot at the free end being marginally less than the diagonal across each respective opening in each tubular member and the diagonal taken across each spigot increasing immediately inwardly of the free end to a diagonal marginally greater than the diameter taken across each respective opening in each tubular member such that when a spigot is inserted completely into the tubular member such that the tubular member is contiguous with the face of the base member, the spigot engages the inner wall of the tubular member to make a press fit therein, each spigot having enlarged diagonal edges such that each diagonal edge is adapted to mate within a respective corner of a tubular member. In yet another of its aspects, the invention provides a connector for connecting hollow tubular members comprising a cube-shaped base member having a plurality of diagonally extending spigots, each spigot made of a zinc or aluminium casting and projecting outwardly from a different face of said cube-shaped base member to a free end and each spigot extending from immediately inwardly of a corner of said base member diagonally straight across the respective face from which it extends to immediately inwardly of the opposite corner of said face, the diagonal taken across each spigot at the free end being marginally less than the diameter across each respective opening in each tubular member and the diagonal taken across each spigot increasing immediately inwardly of the free end to a diagonal marginally greater than the diagonal taken across each respective opening in each tubular member such that when a spigot is inserted completely into the tubular member such that the tubular member is contiguous with the face of the base member, the spigot engages the inner wall of the tubular member to make a press fit therein, each spigot having enlarged diagonal edges such that each diagonal edge is adapted to mate within a respective corner of a tubular member, the enlarged diagonal edges having a pair of bearing surfaces with the space between said bearing surfaces being truncated, each bearing surface adapted to bear on the contiguous inner surface of the tubular member.

Further objects and advantages of the invention will appear from the following description taken together with the accompanying drawings.

BRIEF DESCRIPTION OF THE DRAWINGS

FIG. 4 is a sectional view of a third embodiment of a spigot of the present invention secured within a tubular member.

FIG. 5 is a sectional view of a fourth embodiment of a spigot of the present invention secured within a tubular member.

FIG. 6 is a partial cut away and enlarged view of the embodiment of FIG. 4.

FIG. 7 is an end elevational view of the preferred embodiment of the present invention.

FIG. 8 is a sectional view of an assembly comprising two connectors and a glass shelf.

FIG. 9 is an assembly showing a connector and a wooden shelf.

DESCRIPTION OF THE PREFERRED EMBODIMENT

Figure 1:
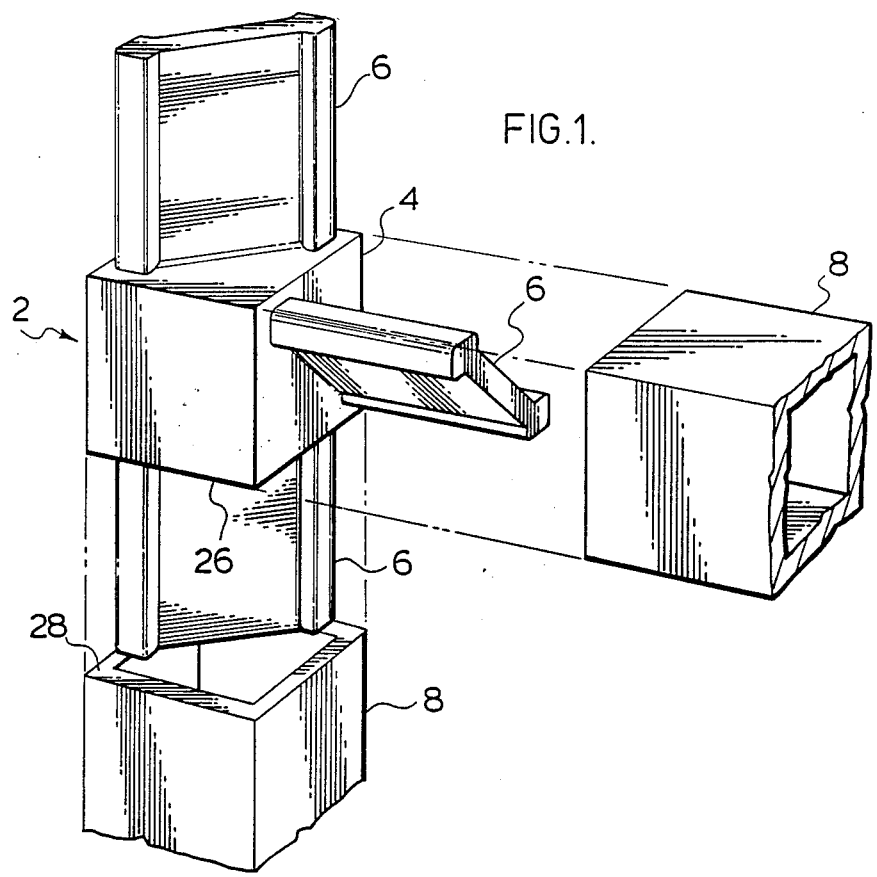
FIG. 1 is a perspective exploded view of a three way connector illustrating the features of the present invention.

Reference is first made to FIG. 1 which shows a perspective view of the connector of the present invention. The connector generally indicated as 2 comprises a cube-shaped member 4 having a plurality of spigots 6 (in this case, three spigots are shown), each spigot projecting outwardly from one face of the cube-shaped member 4.

As shown in FIGS. 1 to 8, the spigot extends from immediately inwardly of a corner of the base member and then diagonally across the respective face from which it extends, to immediately inwardly of the opposite corner of the face. The distance between the terminal end of the spigot and the corner of the face is the same as the thickness of the tubular member so that when the tubular member is mated to the connector, there is formed a smooth joint as shown in FIG. 1.

The connector 2 may have as many spigots 6 as desired for each specific connector, depending on the number of tubular members to be connected.

Preferably each spigot 6 is made of a hard material such as a zinc casting or an aluminium casting and the spigots 6 are cast integral with cube-shaped member 4.

In order to secure the connector 2 to one or more tubular members 8, spigot 6 is inserted into an appropriate hollow, rectangular tubular member 8. The spigot 6 may have different orientations and shapes within the spirit of the present invention and four such embodiments are illustrated in FIGS. 2, 3 ,4 and 5.

Figure 2:
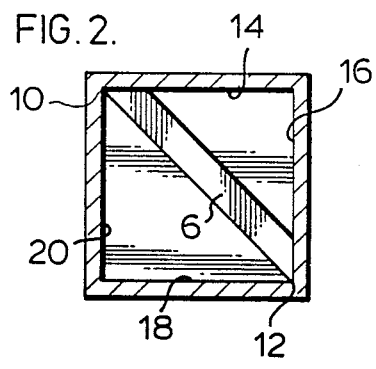
FIG. 2 is a sectional view of one embodiment of a spigot of the present invention secured within a tubular member.

FIG. 2 shows a first embodiment wherein spigot 6 extends between opposed corners 10, 12 of the interior of member 8 but contiguous with adjacent inner sides 14, 16 of the tubular member 8.

Figure 3:
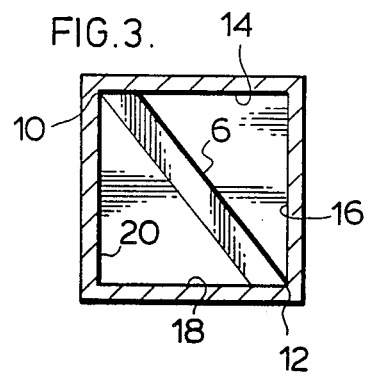
FIG. 3 is a sectional view of a second embodiment of a spigot of the present invention secured within a tubular member.

A second embodiment is shown in FIG. 3 which shows spigot 6 extending between corners 10, 12 of the interior of member 8 but contiguous with opposed sides 14, 18.

A third embodiment is shown in FIG. 4 which shows spigot 6 extending between corners 10, 12 with enlarged ends 22, 24 which nestle within corners 10, 12 thereby contiguous with all four inner sides 14, 16, 18 and 20.

A fourth embodiment and the preferred embodiment is shown in FIG. 5 which shows spigot 6 extending between corners 10, 12 of the interior of member 8. Spigot 6 has enlarged end 22, 24 with the apex therebetween being truncated.

FIG. 6 shows an enlarged, partial view of FIG. 5. As shown in FIG. 6, spigot 6 has an enlarged head 22 which has a first bearing surface 50 which bears on the contiguous portion of surface 14 and a second bearing surface 52 which bears on the contiguous portion of side 20. The apex 54 between surfaces 50, 52 is truncated or curved to reduce material and thus weight, and also to ease insertion.

FIG. 7 shows a preferred embodiment for a four-way connector. The spigot 6 is generally of uniform width (distance X) for most of its length except for the terminal portion 56 which is of width Y. This small taper at the terminal or free end portion 56 of each spigot 6 is such that the distance Y is marginally less than the diagonal of the opening across tubular member 8 so that end 56 can fit within the openings.

However, distance X as shown in FIG. 7 is marginally greater than the diagonal opening of the tubular member 8. Thus, as the terminal end 56 is inserted into the tubular member 8, when the shouldered portion of increased width of each spigot 6 engages the interior surface of tubular member 8, it requires force to force it inside tubular member 8. Since X is marginally larger than the opening, a slight distortion of the tubular member 8 will occur as spigot 6 is forced in the tubular member.

A gentle tap with an instrument such as a hammer on the end of member 8 will bring the end 26 of the connector 2 into contact with end 28 of member 8 (see FIG. 1) thus producing a good mated joint. The distortion to the interior of the member 8 will ensure a good secured joint with no danger of coming loose. Since the distortion is very minor, it cannot be seen by the eye and accordingly, a clean and good looking joint is produced.

In the preferred embodiment, the distance X may be greater than the interior diagonal of the member 8 by the amount of about 1/10,000 inch which will allow for minor distortion to get a good press fit.

The present invention allows for a constructional system which permits the fabrication of rectangular and cubic frameworks. The connector may be of different configurations as shown in FIGS. 2, 3, 4 and 5, and may have as few as two spigots or as many as six spigots depending upon the position in the actual framework to be secured.

The use of a diagonal spigot clearly places the stresses or pressure into the corners of the tubular member 8 where the resistance is greatest and where deformity is least likely to occur. In the prior art, the pressure was applied to the middle of sides 14, 16, 18 or 20 and may cause a bubble or bleed line to form thereby leading to instability, weakness and possible breakage.

One of the important advantages of the present system is that no vinyl insert or plugs are used and no nails, bolts or screws or any other specialized equipment is necessary. In comparing the costs with the costs of using the invention of U.S. Pat. No. 3,666,298 using comparative figures, a saving of about 45% is achieved using the present invention. In the construction of the joint of the connector shown in U.S. Pat. No. 3,666,298, the cost of the vinyl sleeve is about 27% of the total cost and the labour cost of fitting the sleeve and assembling the device will be about 18% of the total cost. Since these costs have been eliminated, this results in a substantial saving of about 45% of the total cost.

A second important feature is that the invention of the present application allows for the use of commercial tubing. Commercial tubing is a piece of tubing formed from a flat, rolled sheet which is folded upon itself with a longitudinal weld line to form the tube. In view of the fact that the prior art devices put pressure on the weld line of the tubing, this resulted in a significant reduction in the strength of the assembly and resulted in possible breakage. Thus, with such prior art devices, it was necessary to use flash welded tubing which costs about 6% more than commercial tubing. The flash welded tubing prevented any swelling up or blistering with the prior art devices but was much more expensive. The present invention has eliminated this problem since the pressure is applied at the corners of the tubular member and not along the weld line. Thus, commercial tubing can be used which represents a further significant reduction in the cost. The difference at the present time between commercial tubing and flash welded tubing is about 6%. Further, by having this spigot apply pressure proximate the corners 10, 12 in the tubular member, it allows for minor variations or distortions in the tubing itself. Thus, if tubing is not exactly of a defined inner dimension, the minor distortions can accommodated which also permits commercial tubing to be used and a satisfactory construction to be made.

Another advantage of the present invention is that its construction allows for the utilization of the exterior surface of the tubular member 8. As shown in FIGS. 8 and 9, by using the diagonal spigot 6, this opens up areas 30, 32 on either side of the spigot 6 on the interior of the tubular member 8. One example is shown in FIG. 8 which shows a channel 36 inserted into slot 38 which extends inwardly into the area 30. The channel 36 may be of differing widths to accommodate a glass shelf 40 as shown in FIG. 8 or a wooden shelf 42 as shown in FIG. 9.

Although the disclosure illustrates and describes a preferred embodiment of the invention, the invention is not so limited.

What I claim is:

1. A connector for connecting hollow tubular members comprising a cube-shaped base member having a plurality of diagonally extending spigots, each spigot projecting outwardly from a different face of said cube-shaped base member to a free end, and each spigot extending from immediately inwardly of a corner of said base member diagonally straight across the respective face from which it extends to immediately inwardly of the opposite corner of said face, the diagonal taken across each spigot at the free end being marginally less than the diagonal across each respective opening in each tubular member and the diagonal taken across each spigot increasing immediately inwardly of the free end to a diagonal marginally greater than the diagonal taken across each respective opening in each tubular member such than when a spigot is inserted completely into the tubular member such that the tubular member is contiguous with the face of the base member, the spigot engages the inner wall of the tubular member to make a press fit therein.

2. A connector as claimed in claim 1 wherein each spigot is made of a zinc aluminium casting.

3. A connector as claimed in claim 1 wherein the number of spigots is from 2 to 6.

4. A connector as claimed in claim 1 wherein each spigot has enlarged diagonal edges such that each diagonal edge is adapted to mate within a respective corner of a tubular member.

5. A connector as claimed in claim 1 wherein each spigot is adapted to mate with opposite interior corners and adjacent interior sides of said tubular member.

6. A connector as claimed in claim 1 wherein each spigot is adapted to mate with opposite interior corners and opposite interior sides of said tubular member.

7. A connector as claimed in claim 1 wherein each spigot is adapted to mate with opposite interior corners and with each interior side of said tubular member adjacent each opposite corner.

8. A connector for connecting hollow tubular members comprising a cube-shaped base member having a plurality of diagonally extending spigots, each spigot made of a zinc or aluminum casting and projecting outwardly from a different face of said cube-shaped base member to a free end, and each spigot extending from immediately inwardly of a corner of said base member diagonally straight across the respective face from which it extends to immediately inwardly of the opposite corner of said face, the diagonal taken across each spigot at the free end being marginally less than the diagonal across each respective opening in each tubular member and the diagonal taken across each spigot increasing immediately inwardly of the free end to a diagonal marginally greater than the diagonal taken across each respective opening in each tubular member such that when a spigot is inserted completely into the tubular member such that the tubular member is contiguous with the face of the base member, the spigot engages the inner wall of the tubular member to make a press fit therein, each spigot having enlarged diagonal edges such that each diagonal edge is adapted to mate within a respective corner of a tubular member.

9. A connector for connecting hollow tubular members as claimed in claim 8 wherein each enlarged diagonal edge of each spigot has a pair of bearing surfaces, each bearing surface adapted to bear on a contiguous inner surface of said tubular member.

10. A connector for connecting hollow tubular members as claimed in claim 9 wherein the area between the pair of bearing surfaces is truncated.

* * * * *